H. B. RICHARDS.
GATE FOR FENCES AND THE LIKE.
APPLICATION FILED APR. 24, 1916.

1,186,945.

Patented June 13, 1916.

Inventor
Halfdan Bogen Richards,
By [signature]
Atty.

UNITED STATES PATENT OFFICE.

HALFDAN BOGEN RICHARDS, OF CHRISTIANIA, NORWAY.

GATE FOR FENCES AND THE LIKE.

1,186,945.

Specification of Letters Patent. Patented June 13, 1916.

Application filed April 24, 1916. Serial No. 93,181.

*To all whom it may concern:*

Be it known that I, HALFDAN BOGEN RICHARDS, a citizen of the United States, residing at Christiania, Norway, have invented certain new and useful Improvements in Gates for Fences and the like; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to improvements in gates for fences and the like, the object of my invention being to provide a gate that is always completely open to the passage of men, but at the same time prevents the passage of cattle and horses through it. This open and shut gate is provided by means of two or more fixed wings, arms or wickets forming in conjunction with the opposite end of the fence a narrow passage for men of so sharp an angle that cattle and horses are prevented from getting through it.

Figure 1:
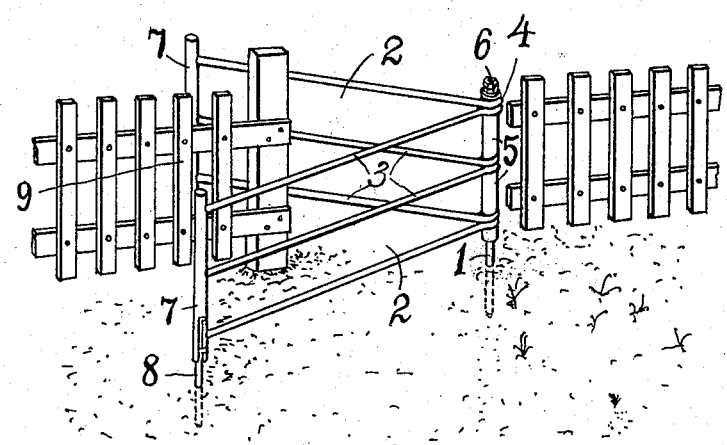
Figure 2:
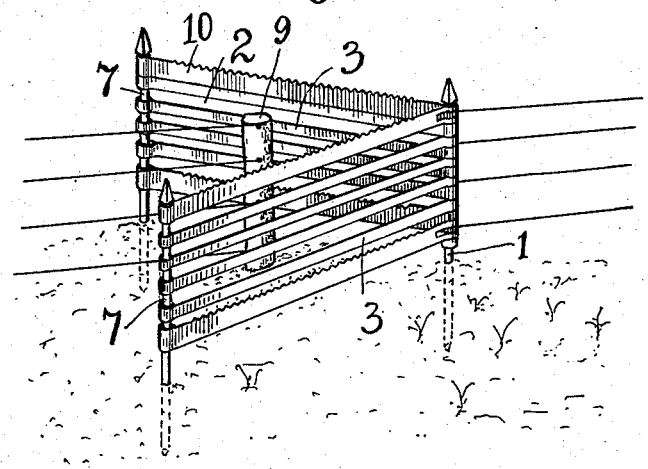

In the accompanying drawings Figures 1 and 2 are perspective views of two different executional forms of my gate.

In Fig. 1 there are provided two wings 2, fixed to a post 1. Each wing is preferably made up of a number of loose arms 3, having eyes 4, threaded on to the post 1. Between each pair of arms there are placed distance tubes 5, said parts being kept in place by aid of wedges, nuts 6 or the like. At their outer ends these arms 3 are threaded into a tubular post 7. At or near the outer ends of the wings there are provided bolts 8, serving to fix the wings in such position relatively to the opposite fence 9 that there is formed a narrow passage of so sharp an angle as to prevent cattle and horses from passing through it, but nevertheless wide enough to allow the passage of men.

Another important feature of my invention is that this arrangement allows for the transforming of this open passage at any time into an open gate wide enough to form a thoroughfare for carriages and the like. This is brought about by pulling up the bolts 8 and swinging the wings 2 out to either side. In some cases, when a particularly wide thoroughfare is wanted, the opposite end 9 of the fence reaching into the said sharp angle may also be arranged in form of a wing that can be swung out to the side, leaving thereby a broad open passage.

In the form shown in Fig. 2 the posts 1 and 7 are formed of iron rods or tubes on which the flat iron arms 3 forming the wings are slid on. As shown the upper arm 10, and preferably also the lower one of said arms are provided with sharp points along their upper edges. These wings are packed in easily transportable packages and are easily put together and mounted by any one.

If more than one thoroughfare is wanted for instance at the crossing of fences this may be provided by augmenting the number of wings. Two pairs of wings may also be arranged opposite each other with one wing of the one gate inserted in the angle of the other, and vice versa.

The wings may also be made of wood, barbed wire or any other suitable material.

Claims:

1. A fence gate comprising two fence sections forming an opening between them, two wings constituting continuations of one of said sections of greater length than the opening and extending beyond and in spaced relation to the other fence section, whereby to form a narrow angular passage extending from one side of the fence to the other.

2. A fence gate comprising two fence sections forming an opening between them, two movable wings constituting continuations of one of said sections of greater length than the opening and extending beyond and in spaced relation to the other fence section whereby to form a narrow angular passage extending from one side of the fence to the other.

3. A fence gate comprising two fence sections forming an opening between them, two movable wings constituting continuations of one of said sections of greater length than the opening, and extending beyond and in spaced relation to the other fence section whereby to form a narrow angular passage extending from one side of the fence to the other, and means for anchoring said wings in various positions of adjustment.

In testimony that I claim the foregoing as my invention, I have signed my name in presence of two subscribing witnesses.

HALFDAN BOGEN RICHARDS.

Witnesses:
AXEL PERMIN,
I. KNUDSEN.

Copies of this patent may be obtained for five cents each, by addressing the "Commissioner of Patents, Washington, D. C."